United States Patent Office 3,093,055
Patented June 11, 1963

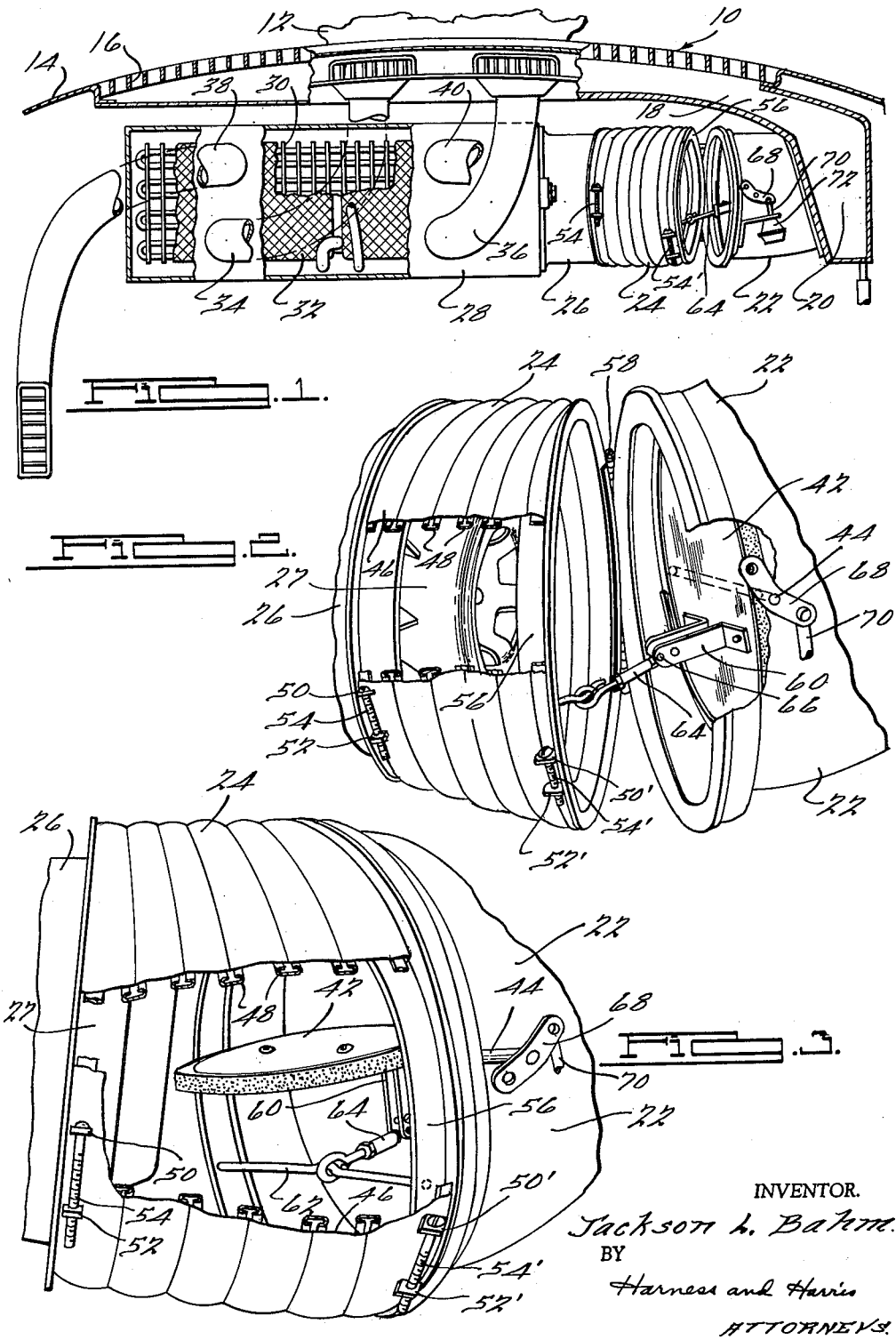

3,093,055
DUCT CONSTRUCTION
Jackson L. Bahm, Royal Oak, Mich., assignor to Chrysler Corporation, Highland Park, Mich., a corporation of Delaware
Filed Mar. 20, 1961, Ser. No. 97,039
2 Claims. (Cl. 98—2)

This invention relates to an air flow control mechanism and more particularly to a means for accommodating the admission of air to the heat exchange apparatus of an automobile air conditioning system.

In current automobile heater and air conditioning installations the need for the admission of air to such apparatus is commonly satisfied by the provision of hinged doors or dampers in the surface walls of ducts. Such dampers possess inherent disadvantages and it is an object of this invention to so mount a duct formed of flexible material that movement of this flexible duct can be controlled to selectively accommodate the admission of air and thereby eliminate the need for a conventional hinged door or damper.

One particular application where the invention is of value is in the ducting of such an air conditioning apparatus when located behind the instrument panel of an automobile. Such apparatus requires that means be provided to selectively admit air from a source for fresh air, such as outside the vehicle, or in the alternative to admit air from the passenger compartment of the vehicle. The admission of such recirculated air from the passenger compartment is useful under some conditions since the air has already been treated on previous passes through the heat exchange apparatus. It is found that the presence of a conventional damper on a hinged mounting often restricts the toe room of the passenger and interferes with other parts located behind the instrument panel. It is an object of this invention to provide air control means that minimizes such interferences.

It is also well-known that in the manufacture of such large objects as an automobile body conditions are frequently encountered where the body panels, when finally assembled, do not conform exactly to the designed dimensions and this produces difficulties when rigid duct work sections of predetermined length are used to connect a plenum in the automobile body with heat exchange apparatus depending from another portion of the body. Obviously, any variation in body dimensions will make the duct installation difficult or even impossible.

It is an additional object of this invention to utilize a duct that is flexible in nature and thus can make up for such deficiencies as may exist in body dimensions by elongation or contraction during installation and to utilize the flexibility of such a duct to produce an air opening when desired.

It is a further object of the invention to provide an air control that is not restricted to the size of a damper, but actually has an area substantially as great as the entire cross section of the duct so that a maximum air flow may be obtained with a minimum of obstruction. This produces advantages in increasing the air flow and reducing the noise produced by such air.

In the drawings:
FIG. 1 is a diagrammatic elevational view, partly in section, of an automobile heat exchange apparatus and some associated automobile components incorporating my invention;
FIG. 2 is an enlarged perspective view of a portion of the apparatus of FIG. 1; and
FIG. 3 is a view similar to FIG. 2 illustrating the parts in another position.

In the drawings a portion of an automobile body 10 is illustrated as including a windshield 12, a cowl 14 provided with air inlet openings 16 and a duct 18 extending transversely of the cowl and terminating in a plenum 20.

A rigid duct 22 and a flexible duct 24, to be discussed herein, provide a fluid flow communication between the plenum 20 and a housing 26 of a blower 27. The blower housing 26 is carried by a housing 28 containing the usual heat exchange apparatus of an automobile. Blower 26 impells air into housing 28 to thereby pass such air over an evaporator coil 30 and a heater coil 32 to modify the temperature of such air and subsequently discharge such air through a plurality of outlets designated by the numerals 34, 36, 38 and 40. The evaporator coil and heater coil are, respectively, cooled and heated by means well-known in the art.

The rigid duct 22 contains an air valve 42 carried by a shaft 44 pivotally mounted for movement between a position illustrated in FIG. 2 wherein the valve 42 completely obstructs the flow of air from the rigid duct 22 to an alternative position illustrated in FIG. 3 wherein the air valve 42 is positioned so that it offers a minimum of obstruction to the passage of air from rigid duct 22.

The flexible duct 24 comprises a flexible outer skin such as fabric 46 supported by one or more stay members 48 in a conventional manner. One stay member 48 terminates in tabbed ends 50 and 52 with the tab 52 internally threaded to receive a screw 54 so that the flexible duct 24 may be circumferentially compressed about a flange 54 carried by housing 26. The other end of flexible duct 24 has similar tabs 50' and 52' and a screw 54' which cooperate to contract that end of the flexible duct 24 about a collar 56 which is hingedly mounted at 58 to a terminal portion of rigid duct 22.

A mechanical connection exists between collar 56 and air valve 42 and includes a bracket 60 supported by air valve 42, a strap 62 carried by collar 56 and link apparatus 64 extending between strap 62 and a pivotal mounting 66 on bracket 60.

The air valve 42, which is carried by shaft 44, is selectively moved to either its FIG. 2 or FIG. 3 positions by means of any well-known apparatus which may be operated manually or, as illustrated in the drawings, by means of a lever 68 keyed to shaft 44 and connected by a link 70 to a diaphragm actuator 72. Diaphragm actuators are commonly used for positioning heater valve parts by means of engine vacuum. It will be seen that with the air valve in its FIG. 2 position the collar 56 is open relative to the end of rigid duct 22 such that the two in effect operate as a mouth and they are illustrated in open position to accommodate admission of air from the passenger compartment of the vehicle to the blower 27 so that air may be recirculated from the passenger compartment through the heat exchange apparatus and back to the passenger compartment while the air valve 42 isolates the pasenger compartment from plenum 20 and its outside air inlets.

When the operator desires that fresh outside air be admitted and passed through the heat exchange apparatus and that no air be drawn from the pasenger compartment then the air valve 42 is moved to its FIG. 3 position and because the bracket 60 is spaced from shaft 44 the link 64 and strap 62 pull on the collar 56 to effect movement of that collar about hinge 58 to the closed position illustrated in FIG. 3 wherein fresh outside air passes directly from rigid duct 22 through flexible duct 24 to blower 27.

It should be noted that the opening illustrated in FIG. 2 for the admission of air from the passenger compartment is of maximum size relative to the size of the ducts and it has a greater area than would be possible with any reasonably sized damper of conventional construction. Similarly, it will be noted that a minimum of obstruction is presented by the apparatus either to a passenger's feet or to other components normally located beneath the cowl of an automobile. A conventional damper hinged on an axis in the circumferential wall of a duct would have these disadvantages.

The flexible nature of the duct 24 possesses an additional advantage in that variations between dimensions in similar automobiles may be compensated for by extension or contraction of the flexible duct 24. If the accumulated tolerances in the body sheet metal of a car differ, as they will, from the optimum then a serious problem is presented where duct work of preformed and rigid construction is used. Although flexible ducts, per se, are not my invention the use of such a flexible duct in the apparatus illustrated to retain the advantages of a flexible duct and to provide a novel air inlet has been found to offer unexpected advantages.

I claim:

1. Air supply apparatus for controlling the delivery of air to the heat exchange mechanism of an automobile air conditioning system, said apparatus being located in the passenger compartment of the automobile and including a first duct extending from a first external source of air and terminating in an open end, a valve movably mounted in said first duct for movement between a closed position in which it obstructs the flow of air in said first duct and an open position, a second duct of a flexible construction having one end in fluid flow communication with the above mentioned heat exchange mechanism, said apparatus including a stiff hollow member movably mounted adjacent the open end of said first duct and a tubular element formed of flexible material, said tubular element being carried by said stiff member for movement thereby, said stiff hollow member and the open end of said first duct having complementary contours adapted to effect a sealing engagement to define a continuous air passage when the hollow member and the open end of the first duct register with each other, and control linkage interconnecting said stiff member and said valve, movement of said stiff member being operable to flex said second duct and selectively move said second duct into sealing engagement with the open end of said first duct to receive air therefrom and into an open position relative to said first duct to accommodate the reception of air in said second duct from the passenger compartment of the automobile, said control linkage being operable to move said valve and said stiff member in unison so that said valve is in its open position whenever said second duct is in sealing engagement with the open end of said first duct to deliver air from the external source to said heat exchange mechanism and said valve closes when said second duct is moved to its open position relative to said first duct to admit air from the passenger compartment to said heat exchange mechanism.

2. Air supply apparatus for controlling the delivery of air to the heat exchange mechanism of an automobile air conditioning system, said apparatus being located in the passenger compartment of the automobile and including a first duct extending from a first external source of air and terminating in an open end, a valve movably mounted in said first duct for movement between a closed position in which it obstructs the flow of air in said first duct and an open position, a second duct of a flexible construction having a downstream end in fluid flow communication with the above-mentioned heat exchange mechanism and an upstream end movably mounted adjacent the open end of the first duct downstream of said valve, said upstream end of said second duct and said open end of said first duct having complementary contours adapted to effect a sealing engagement to define a continuous air passage when the ends of said ducts register with each other, mechanism operable to flex said second duct and selectively move said upstream end of said second duct into registry with the open end of said first duct to receive air therefrom and into an open position relative thereto to define a second source of air by accommodating the reception of air in said second duct from the atmosphere of the automobile passenger compartment, and mechanism interconnecting said valve and said second duct such that said valve is in its open position whenever said upstream end of said second duct is in sealing engagement with the open end of said first duct and said valve closes when said upstream end of said second duct is moved to its open position relative to said first duct to thereby condition said air supply apparatus to alternatively place said heat exchange mechanism in fluid flow communication with either said first or said second source of air.

References Cited in the file of this patent
UNITED STATES PATENTS

| | | |
|---|---|---|
| 2,198,156 | Findley | Apr. 23, 1940 |
| 2,279,369 | Findley | Apr. 14, 1942 |